United States Patent [19]

Rongley

[11] Patent Number: 5,758,322

[45] Date of Patent: May 26, 1998

[54] METHOD AND APPARATUS FOR CONDUCTING POINT-OF-SALE TRANSACTIONS USING VOICE RECOGNITION

[75] Inventor: Eric H. Rongley, Newtown, Pa.

[73] Assignee: International Voice Register, Inc., Newtown, Pa.

[21] Appl. No.: 353,534

[22] Filed: Dec. 9, 1994

[51] Int. Cl.$^6$ .................................................. G10L 9/00
[52] U.S. Cl. ............................................ 704/275; 704/270
[58] Field of Search ........................ 395/2.4, 2.6, 2.84, 395/2.52, 2.53, 2.55, 2.61, 2.56

[56] References Cited

U.S. PATENT DOCUMENTS

| | | | |
|---|---|---|---|
| 4,482,976 | 11/1984 | Ishikawa | 395/2.24 |
| 4,590,604 | 5/1986 | Feilchenfeld | 381/42 |
| 4,618,936 | 10/1986 | Shiono | 395/2.76 |
| 4,618,984 | 10/1986 | Das et al. | 381/43 |
| 4,653,097 | 3/1987 | Watanabe et al. | 381/42 |
| 4,677,569 | 6/1987 | Nakano et al. | 395/2.84 |
| 4,704,696 | 11/1987 | Reimer et al. | 395/2.84 |
| 4,827,520 | 5/1989 | Zeinstra | 381/43 |
| 4,882,685 | 11/1989 | van der Lely | 364/709.11 |
| 5,027,406 | 6/1991 | Roberts et al. | 381/43 |
| 5,040,212 | 8/1991 | Bethards | 381/41 |
| 5,054,082 | 10/1991 | Smith et al. | 381/42 |
| 5,128,862 | 7/1992 | Mueller | 364/405 |
| 5,204,894 | 4/1993 | Darden | 379/88 |
| 5,208,449 | 5/1993 | Eastman et al. | 235/462 |
| 5,208,745 | 5/1993 | Quentin et al. | 364/188 |
| 5,208,848 | 5/1993 | Pula | 379/67 |
| 5,231,670 | 7/1993 | Goldhor et al. | 395/2.84 |
| 5,235,509 | 8/1993 | Mueller et al. | 364/405 |
| 5,241,649 | 8/1993 | Niyada | 395/2.43 |
| 5,255,326 | 10/1993 | Stevenson | 381/110 |
| 5,305,244 | 4/1994 | Newman et al. | 364/708.1 |
| 5,357,596 | 10/1994 | Takebayashi et al. | 395/2.84 |
| 5,408,536 | 4/1995 | Lemelson | 382/2 |
| 5,428,707 | 6/1995 | Gould et al. | 395/2.4 |
| 5,452,397 | 9/1995 | Ittycheriah et al. | 395/2.49 |
| 5,553,312 | 9/1996 | Gattey et al. | 455/11.1 |

OTHER PUBLICATIONS

Gliedman, "Turning Talk Into Action: Voice Dictation and Voice Command Systems," Computer Shopper, 780–81., Sep. 1994.

Lane, "Expert's Toolbox: Store–Bought Recognition Tools," AI Expert, 11–12., Oct. 1994.

Goddard, "A New Frontier: The Practical Side of Voice Recognition Technology," Canadian Computer Reseller, vol. 5, No. 1, p. 19., Jan. 1992.

"Getting a Slice of the Action," Information Week, n. 505, p. 58+., Dec. 1994.

Microsoft Press, "Computer Dictionary," 2d ed., Microsoft Press: Redmond, Washington, pp. 295, 330., Dec. 1994.

Primary Examiner—Allen R. MacDonald
Assistant Examiner—Vijay B. Chawan
Attorney, Agent, or Firm—Townsend and Townsend and Crew LLP

[57] ABSTRACT

A method and apparatus for conducting point-of-sale transactions using both speaker dependent and speaker independent voice recognition in which a spoken utterance from a first user is captured with a sound input device. The spoken utterance is compared to a first plurality of stored patterns to find a first match. A product order is generated based on the first match found in the comparing step. The comparing and generating steps may be repeated for each additional product purchased. A bill is then calculated based on the product orders. The plurality of stored patterns, also referred to as a voice layer, comprises a subset of a user vocabulary stored in a memory. The voice layer, i.e., the plurality of stored patterns to which the spoken utterances are compared, changes to include different sets of likely words from the vocabulary depending upon the context of the transaction. In the speaker dependent embodiment, the user vocabulary is specific to the first user.

15 Claims, 17 Drawing Sheets

FIG. 3

CURRENT ORDER | PREVIOUS ORDER

Please enter password or insert oice card now.

XXXXX

International Voice Register ©1994. All rights reserved.

100

EMPLOYEE TIMECLOCK

Timecard
7:30 A-4:00 P

Mon
Tues
Wed
Thurs
Fri
Sat
Sun
Mon
Tues
Wed
Thurs
Fri
Sat
Sun

2:49 PM    September 7, 1994

Ima Waitress

You are now clocked in. Please wait while your voice files are copied to this terminal (or voice card).

ESTIMATE WAGES    WAGES TO DATE $

TRAIN WORDS    TERMINALS

CASH OUT

FINISHED

| | Mon | Tue | Wed | Thu | Fri | Sat | Sun |
|---|---|---|---|---|---|---|---|
| week 1 | | 5-C | | 5-C | | 11-2 | 11-2 |
| week 2 | | | | | | | |

International Voice Register ©1994. All rights reserved.

*FIG. 4*

CURRENT ORDER

Server: Ima Waitress
Ticket #: 101
Table #: To go    2:39 PM

| Items | Price |
|---|---|
| 1 hamburger | 1.89 |
| 1 french fries | 0.99 |
| sub | 2.88 |
| disc | 0.00 |
| tax | 0.20 |
| Total | 3.08 |

Options — 146
- ENTER MENU ITEMS — 148
- TOTAL
- COUPON — 150
- OOPS — 152
- MODIFY TICKET — 154
- VOID — 156

Last item ordered
1 french fries  0.99 — 144

PREVIOUS ORDER

Ticket #: 100    Server: Ima Waitress

| Items | Price |
|---|---|
| 2 cheeseburger | 4.24 |
| 2 soft drink | 2.14 |
| sub | 6.38 |
| disc | 0.00 |
| tax | 0.50 |
| Total | 6.88 |

— 162

MODIFY PREVIOUS TICKET — 158
SCROLL PREVIOUS TICKET — 160

Amt tendered  $ 7.00
Change given  $ 0.12

International Voice Register ©1994. All rights reserved.

*FIG. 5*

CURRENT ORDER

Server: Ima Waitress
Ticket #: 101

| Items | Price |
|---|---|
| 1 hamburger | 1.89 |
| 1 french fries | 0.99 |
| sub | 2.88 |
| disc | 0.00 |
| tax | 0.20 |
| Total | 3.08 |

2:39 PM

Table #: To go

Options — *182*

ENTER MENU ITEMS

EXACT — *184*

OOPS

CASH/CREDIT/DEBIT — *186*

Amount tendered
5.00

Last item ordered
1 french fries   0.99

PREVIOUS ORDER

Ticket #: 100   Server: Ima Waitress

| Items | Price |
|---|---|
| 2 cheeseburger | 4.24 |
| 2 soft drink | 2.14 |
| sub | 6.38 |
| disc | 0.00 |
| tax | 0.50 |
| Total | 6.88 |

MODIFY PREVIOUS TICKET

Amt tendered
$ 7.00

Change given
$ 0.12

International Voice Register ©1994. All rights reserved.

CURRENT ORDER

Server: Ima Waitress
Ticket #: 101

Table #: To go       2:40 PM

| Items | Price |
|---|---|
| 1 hamburger | 1.89 |
| 1 french fries | 0.99 |
| sub | 2.88 |
| disc | 0.00 |
| tax | 0.20 |
| Total | 3.08 |

Options

Amount tendered  5.00

Change  1.92

OOPS — 222     Cancel — 228

Last item ordered
1 french fries   0.99

PREVIOUS ORDER

Ticket #: 100    Server: Ima Waitress

| Items | Price |
|---|---|
| 2 cheeseburger | 4.24 |
| 2 soft drink | 2.14 |
| sub | 6.38 |
| disc | 0.00 |
| tax | 0.50 |
| Total | 6.88 |

MODIFY PREVIOUS TICKET — 226

Amt tendered   $ 7.00

Change given   $ 0.12

International Voice Register ©1994. All rights reserved.

CURRENT ORDER

Server: Ima Waitress
Ticket #: 101

| Items | Price |
|---|---|
| 1 hamburger | 1.89 |
| 1 french fries | 0.99 |
| sub | 2.88 |
| disc | 0.00 |
| tax | 0.20 |
| Total | 3.08 |

2:41 PM    Table #:    To go

Options

EAT WHERE?

- TO GO — 264
- HERE — 266
- DRIVE-THRU — 268
- TIME CLOCK — 270
- BACK OFFICE — 272

Last item ordered

PREVIOUS ORDER

Ticket #: 100    Server: Ima Waitress

MODIFY PREVIOUS TICKET — 262

| Items | Price |
|---|---|
| 2 cheeseburger | 4.24 |
| 2 soft drink | 2.14 |
| sub | 6.38 |
| disc | 0.00 |
| tax | 0.50 |
| Total | 6.88 |

Amt tendered  $ 7.00
Change given  $ 0.12

International Voice Register ©1994. All rights reserved.

```
Amount tendered: < >
Change returned: < >

Where do you want to eat?

Please select one of these...

Eat in
         Take Out
```

```
     To accept customer order,
    Start speaking menu items now

Or to view menu
           Say "MENU"

/* If at least one item has been ordered */
          "TOTAL" "COUPONS"

/* If With/Without group exists */
          "With" "Without"
```

```
  This item is not available currently

To order another item
            say a menuitem

"OK"

Or to view menu
           Say "MENU"

/* If at least one item has been ordered */
          "TOTAL" "COUPONS"
```

FIG. 11d

```
Choose one of these discounts/coupons:
#      Discount/Coupon
1      Manager
2      Senior Citizen
3      Employee
4      Special
5      Coupon # 1234 Expires 10/3/94
6      Coupon # 2345 Expires 13/2/94
"OOPS" "PgUp" PgDn" "#s, 1..10"
"Show #"
```

*FIG. 11k*

```
Description of Coupon: <coupon id>
This coupon works on <item Description>

With a purchase of <1 Large Coke>
1 Small Coke is given at 50% OFF

This coupon is valid
   From: mm/dd/yy
     To: mm/dd/yy
```

*FIG. 11l*

```
MANAGER DISCOUNT

To discount at an item level,
Select the item line # now:
            OR
Select "Ticket Level"

"OOPS" "#s, 1..10" "Ticket Level"
```
506m

FIG. 11m

```
Enter a discount % or amount

Percent: <discount %>
            OR
Amount: <discount amount>
"OOPS"
```
506n

FIG. 11n

METHOD AND APPARATUS FOR CONDUCTING POINT-OF-SALE TRANSACTIONS USING VOICE RECOGNITION

BACKGROUND OF THE INVENTION

The present invention relates to a method and apparatus for conducting point-of-sale transactions using both speaker dependent and speaker independent voice recognition techniques.

Voice recognition technology has been rapidly improving to the point where it soon will be possible to conduct many common transactions using only vocal commands and responses. The retail industry is one area in which the impact of voice recognition technology is likely to be felt in the near future. Voice recognition techniques have many desirable features which will be of considerable value in the retail industry. For example, the use of voice recognition will allow a user to have her hands free for other tasks, thereby making the retail function more efficient. Employees with disabilities might also benefit from the reduction of physical requirements in performing retail tasks. Additionally, because of the uniqueness of a human voice print, access to different levels of information in a database may be carefully circumscribed. Thus, in a retail setting, an employee would have access to lower level retail and timekeeping functions, while a manager would have access to higher level inventory and personnel information.

Currently, bar code scanning is widely used in the retail industry. Bar code scanning has been shown to be quite efficient in settings in which a large number of items are purchased, e.g., grocery stores. It is unlikely that voice recognition would supplant bar code scanning for such applications because scanning would likely remain more efficient than naming each and every item. However, there are other applications for which voice recognition seems more appropriate than bar code scanning. One example is the restaurant industry where bar code scanning would be impracticable for several obvious reasons. Moreover, within the restaurant industry, voice recognition techniques seem well suited for anything from fast food to fine dining.

Voice recognition technology may be divided into two categories, speaker dependent and speaker independent technology. With speaker dependent technology, a voice file is created for each user in which at least one sample of each word which the system is intended to recognize is stored. With such a system, the different ways in which different people pronounce the same words would be, in a sense, "filtered out" as a potential recognition problem. With a speaker dependent system, the theoretical size of the vocabulary may be very large. However, certain drawbacks exist with current speaker dependent technology. For example, with a speaker dependent system, the creation of voice files for each user is time consuming and requires considerable memory resources, thereby limiting both the number of users and the size of the recognizable vocabulary. Such a system would not be practicable, for example, in a fast food drive-through application.

In contrast, speaker independent technology may be used with a very large number of users and only one vocabulary file with which captured utterances are compared. However, given the diversity of human speech patterns, only a limited vocabulary may be used if a high degree of accuracy is desired. From the foregoing, it becomes clear that the choice of voice recognition technology largely depends upon the application in which it is to be employed. Factors to consider in making the decision are the number of potential users, the size and complexity of the user vocabulary, available memory, and user training considerations.

Issues facing both types of voice recognition technology include the accuracy and speed with which human speech may be recognized. Both accuracy and speed depend, in part, on the size of the user vocabulary with which captured voice samples are being compared. Speed of recognition depends on the size of the user vocabulary because as the number of words increases, the time required to search through the vocabulary to locate a match also increases. The connection between accuracy of recognition and vocabulary size is not quite as straightforward, but may be more problematic in terms of overall system operation. The larger the user vocabulary gets, the more complex the task of matching captured voice samples to stored words becomes, and therefore the greater the likelihood of error. Moreover, the occurrence of similar words within the vocabulary increases with the size of the vocabulary, thereby further contributing to the error rate.

From the foregoing it is apparent that there is a need for a voice recognition system which increases the speed and accuracy with which voice samples may be acquired and recognized. The present invention provides such a system using both speaker dependent and speaker independent technology.

SUMMARY OF THE INVENTION

According to the present invention, methods and apparatus are provided for conducting point-of-sale transactions using voice recognition techniques. Embodiments of the invention using both speaker dependent and speaker independent techniques are described. One speaker dependent system described herein stores a separate voice file for each user containing a vocabulary specific to that user. When the user logs on to the system, a local controller retrieves the user's voice file from main memory and places it in a local memory at the user's sales location. The user of the system may then conduct sales transactions using a series of vocal commands and responses. The system receives the user's voice by means of a sound input device such as a microphone. The local controller then compares the vocal commands and responses of the user to stored samples of the user's voice from the voice file. The controller does not compare received sounds to every sample in the voice file, but selects subsets of the voice file, also referred to herein as voice layers, for the comparison based upon the context, e.g., the stage of the transaction and/or the level of access of the user. In other words, the system "listens" for specific words at specific times. This feature facilitates the speed and accuracy of voice recognition. Once a word or phrase is recognized, the system may display or communicate the word or phrase to the user (e.g., for verification), or perform the function requested. Thus, the present invention moves through a plurality of voice layers within a user's vocabulary throughout the user's interaction with the system.

A speaker independent system is described herein which operates in a similar manner. However, because with a speaker independent system, the customer is generally the user, it is not practical to store individual voice files for each user. With such a system, received sounds are compared to a selected one of several stored speaker independent vocabularies. As with the speaker dependent system, received sounds are only compared to selected voice layers within the selected vocabulary. The selected voice layer changes depending upon the context, e.g., the stage of the transaction.

According to one embodiment of the invention, a method and apparatus are provided in which a spoken utterance from a user is captured with a sound input device. The spoken utterance is compared to a plurality of stored patterns to find a match. A product order is generated based on the match. The capturing, comparing, and generating steps may be repeated for each additional product purchased. A bill is then calculated based on the product orders. The plurality of stored patterns comprises a subset of a user vocabulary stored in a memory. The subset changes to include different sets of likely words from the vocabulary depending upon the stage of the transaction. In the speaker dependent embodiment, the user vocabulary corresponds to the first user, i.e., is user specific. It will be understood that the present invention is not limited to English, and will work with any language.

A further understanding of the nature and advantages of the present invention may be realized by reference to the remaining portions of the specification and the drawings.

BRIEF DESCRIPTION OF THE DRAWINGS

FIGS. 3–8 show a series of screens encountered by users of one embodiment of the present invention;

DESCRIPTION OF THE PREFERRED EMBODIMENT

Figure 1:
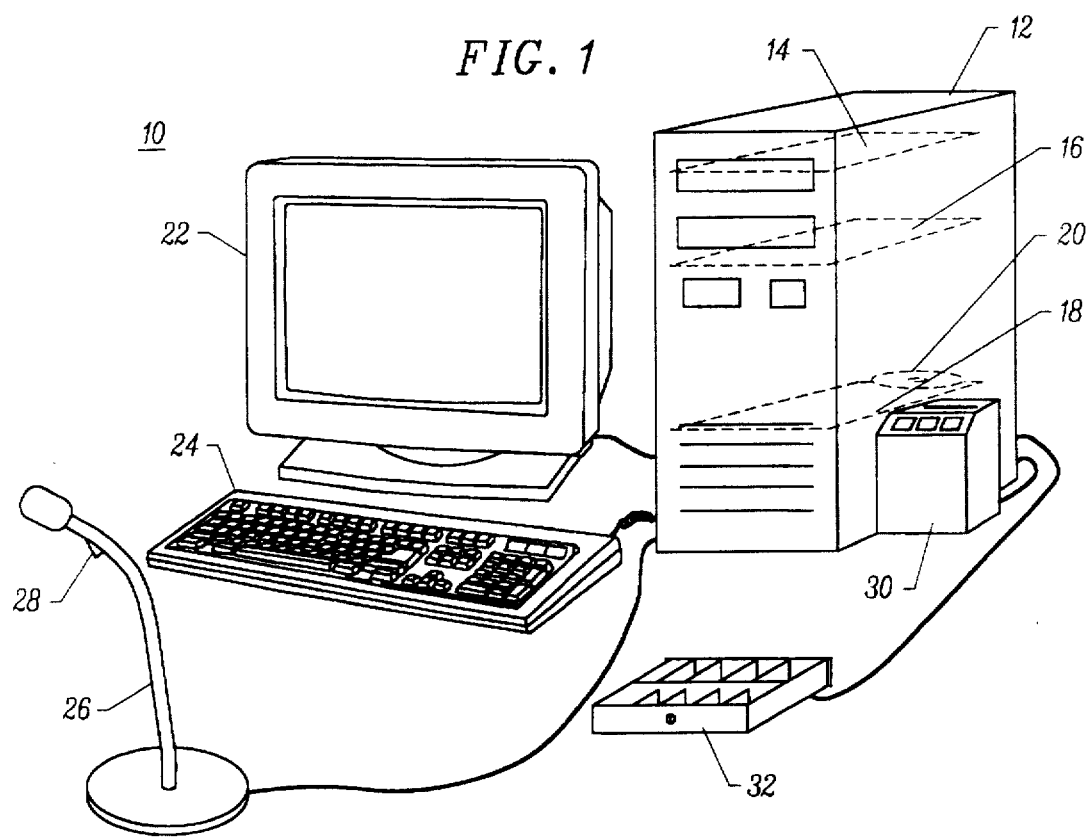
FIG. 1 shows a voice controlled register designed according to one embodiment of the present invention.

FIG. 1 shows a voice controlled register designed according to one embodiment of the present invention. Voice controlled register 10 includes a personal computer (PC) 12 which includes a voice recognition module 14, a network board 16, and a fax/modem board 18. PC 12 also includes a random access memory (RAM) disk 20 in addition to its usual RAM and hard disk storage (not shown). Standard display terminal 22 and keyboard 24 are shown connected to PC 12. Microphone 26 is also connected to PC 12 for capturing voice samples from the users of register 10. Microphone 26 has a manual switch 28 which transmits and enable signal, thereby enabling microphone 26 when the user wishes to activate the voice recognition features of register 10. Register 10 also includes PCMCIA memory card reader 30 coupled to PC 12 for downloading voice files stored on PCMCIA memory cards. In one embodiment, cash drawer 32 opens in response to a verbal command from the user. In addition to microphone 26, register 10 may also employ other input means. For example, a bar code scanning device may be employed for entering inventory. Display terminal 22 may be outfitted with a touch-sensitive screen for certain options. Additionally, a touch pad may be provided for entering data. Various combinations of these input means are employed according to specific embodiments of the present invention.

Figure 2:
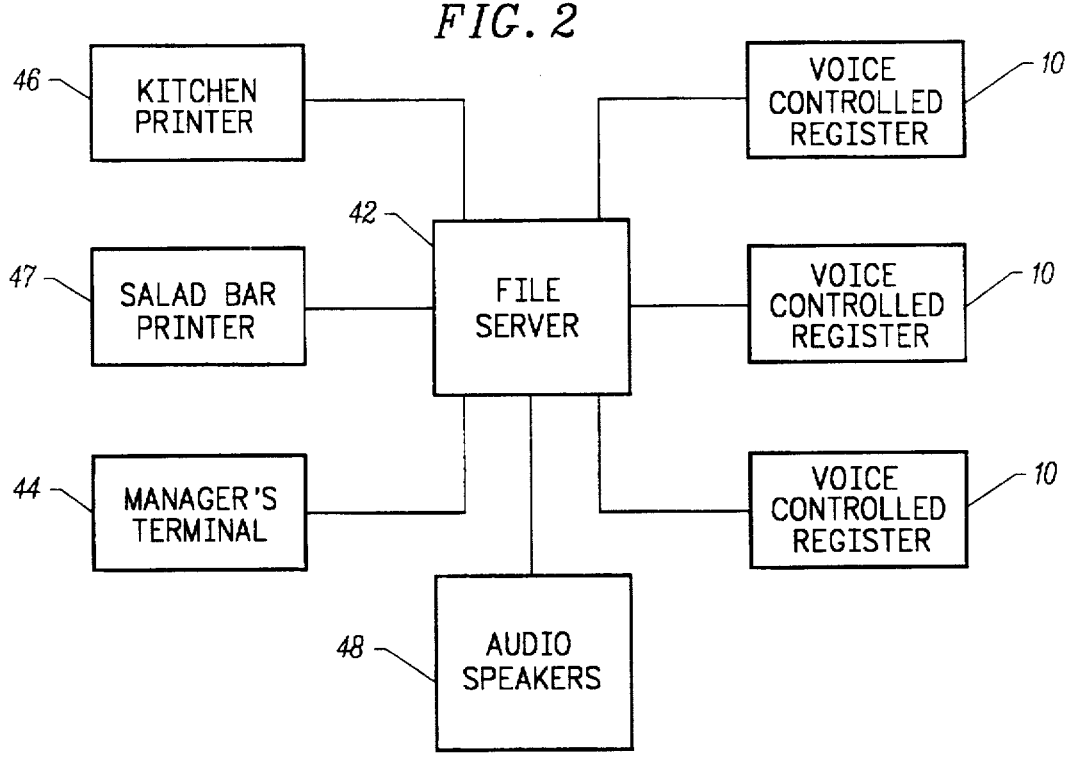
FIG. 2 is a block diagram which shows a restaurant system which incorporates voice controlled registers of the present invention.

FIG. 2 is a block diagram which shows a restaurant system 40 which incorporates several voice controlled registers 10. System 40 is controlled by file server 42 which handles the network protocols and data storage for the system, storing, among other things, the voice files for each system user. Some number of voice controlled registers 10 (three are shown) are connected to file server 40 from which each may retrieve user voice files, timekeeping information, inventory information, etc. A manager's terminal 44 is also connected to the file server from which a user can monitor individual registers, overall system operation, timekeeping and inventory information, etc. Terminal 44 may also be used for training new employees on the system. Essentially, terminal 44 operates similarly to registers 10 except that retail functions are not supported. Kitchen printer 46 and salad bar printer 47 communicate food orders from registers 10 to cooks and other kitchen personnel. In addition to printers, audio speakers 48 may also be employed to verbally communicate incoming orders to the cooks so that they will not be required to rely solely on a printout.

In another embodiment, microphone 26 of register 10 is replaced by remote headsets having microphones and speakers which are carried by, for example, waiters in a fine dining environment. Orders are taken at tables and transmitted to the register PC. When an order is relayed in this manner, the register interprets the understood word and sends it back to the waiter for verification. It will be understood that a wide variety of devices may be employed to perform the function of communicating information to and from register 10.

The basic operation of a voice controlled register system according to one embodiment of the invention is as follows. A system memory such as, for example, the memory in a file server, stores a separate voice file for each user, the voice file containing a vocabulary specific to that user. When the user logs on to the system, the user's voice file is retrieved from the main memory and placed in the memory at the user's sales location, usually a PC or equivalent with a microphone. In different embodiments, the user may log on to the system using, for example, a vocal log-in command or a sequence of keystrokes. The user of the system may then conduct sales transactions using a series of vocal commands and responses. The system receives the user's voice by means of the microphone. The system then compares the received vocal commands and responses of the user to stored samples of the user's voice from the retrieved voice file. The system does not compare received sounds to every sample in the voice file, but selects subsets of the voice file for the comparison based on what stage of the transaction is being conducted. In other words, depending upon the current context, the system decides for which words it will "listen". This feature facilitates the speed and accuracy of voice recognition. Once a word or phrase is recognized, the system may display or communicate the word or phrase to the user, or perform the function requested. In one embodiment, an additional memory (e.g., a RAM disk) is included in each register which stores the user vocabularies for the employees logged on to that particular register. When a particular user subsequently logs on to the register, that user's voice file is loaded into the system RAM from the RAM disk. This avoids the delay caused by loading the voice file from the register's hard disk or the system server.

The following is a detailed description of the operation of a voice controlled register system according to one embodiment of the invention. The embodiment described is employed in the environment of a fast food restaurant, but it will be evident that use of the invention is not limited to such applications. The operation of the system will be described with reference to a series of display screens shown in the figures.

When beginning operation of the system, an employee of the fast food restaurant encounters the message "Please enter password or insert voice card now" on screen 100 as shown in FIG. 3. Upon the entering of a password by the employee (either manually or vocally), the voice file corresponding to the employee is loaded from the server to the PC's hard disk and, if one exists to the PC's RAM disk and the RAM disks of any registers on which the employee will be working. Alternatively, the insertion of a voice card into card reader 30 (FIG. 1) will cause the system to download the employee's voice file from the voice card to the RAM disk, or to locate the employee's already loaded voice file on the RAM disk. Once the employee's voice file is loaded onto the RAM disk, the system checks the time clock to determine whether the employee has already clocked in. If the employee has not clocked in, the system advances to display screen 110 as shown in FIG. 4.

From display screen 110, the Employee Timeclock screen, the employee may perform a number of functions. In response to the entering of a password, the system retrieves the employee's time card file from the file server, clocks the employee in, and displays the time card 112 as shown. The employee may check her work schedule shown in box 114, or estimate her wages based upon hours worked to date by saying "estimate wages" as shown in box 116 and reading the amount shown in box 118. The employee may also train the system to recognize new words or retrain the system to better recognize words with which the system has been having difficulty. To accomplish this, the employee says "train words" as shown in box 120 which causes the system to go into a vocabulary acquisition mode in which the employee may add words to her vocabulary or retrain the system for troublesome words. The addition or alteration of the employee's vocabulary is carefully circumscribed according to the employee's security level, i.e., level of access. That is, only words for which that particular employee has authorization will be entered into the employee's vocabulary. The system prompts the employee to repeat three times each word to be entered into the vocabulary. Each is then added to the employee's vocabulary. When the training session is complete, the system returns to screen 110.

If a waiter or cashier wishes to cash out she says "cash out" (box 122 of screen 110) in response to which the system enters a cash out mode. Again, access to the cash out mode is only allowed those employees with the proper authorization. The register begins tracking a particular cash drawer assigned to a particular employee when the employee clocks in. The process is begun by the manager initiating an audit from the manager's screen by saying "begin audit". The system then lists all employees who are clocked in and eligible to be a cashier. The manager chooses one or more of these employees to be cashiers, and enters the amount given to the employee, and in which cash drawer and at which terminal the employee will be working. The manager then physically gives a cash tray to the employee who takes it to the designated terminal and logs on. The employee confirms the amount of money in the tray at which point the designated cash drawer pops open allowing the employee to insert the cash tray. When the employee says "cash out", the system prints an audit sheet which details such information as total cash, total coupons, total charges, checks, etc. The audit sheet has blank spaces next to a list cash denominations (e.g., twenties, tens, fives, etc.) which are filled out by the employee upon counting the cash in the cash drawer. During this procedure, the employee may say "calculator" to access calculator functions in the register to assist the employee with counting the totals for each type of transaction settlement. When the employee has filled out the audit sheet, they sign it and turn it in to the manager along with the cash tray. Any shortages or excesses in the cash tray will have been detected by the system. The manager then says "end audit" to his terminal, in response to which his terminal shows a list of cashiers who have cashed out but not yet ended their audits. The manager then chooses the employee's name and fills in the total amounts for each settlement type. The system request confirmation of any shortages or excesses entered and then saves the amounts. The manager then signs the audit sheet and files it.

Referring back to FIG. 4, once the employee has clocked in and performed any of the desired functions from screen 110, she says "finished" (box 124) in response to which the system copies the employee's voice file to any other registers and/or terminals designated by the employee via box 126. Alternatively, the system may copy the employee's voice file to a PCMCIA voice card which the employee may insert in any of the other registers she anticipates using. The system then returns to screen 100. When the system determines that the employee has clocked in, either previously or using the above-described procedure, the system advances from screen 100 to screen 140 as shown in FIG. 5.

Screen 140 shows an order taking screen as it appears during the course of a transaction. After the employee states the name of each new menu item, the menu item and its price appear in their respective columns in a current order ticket box 142. The last item ordered appears in box 144 and is replaced each time a new item is ordered. In a specific embodiment, the employee is prompted to repeat the menu item when a match is not found. In another embodiment, a most likely match for the menu item is found when a direct match is not found. The system then determines whether the employee spoke words corresponding to the most likely match by querying the employee as to whether this was the requested menu item. In still another embodiment, the voice controlled register is configured to interpret certain elements of grammar. For example, after each menu item is entered, the register generally waits for the next menu item. However, if the employee says "without" following a menu item, the register knows that the next utterance to be captured will be related to undesired ingredients for the most recently entered menu item. Thus, the register "listens" specifically for these ingredients.

In yet another embodiment, the system has an upper and a lower threshold for comparison to the confidence level determined for a vocabulary word match for a captured utterance. If the confidence level for a particular match is above the upper threshold, the utterance is accepted. If it is between the two thresholds, the system prompts the speaker either to repeat the utterance or asks if the vocabulary word with the highest confidence level was intended. If the confidence level is below the lower threshold, the utterance is ignored.

This important selective "listening" feature of the invention may be easily understood when described with reference to screen 140. The transaction depicted is at a stage during which menu items may be entered (box 146). The list of options also includes totaling the ticket (box 148), accounting for coupons (box 150), correcting errors (box 152), modifying the ticket (box 154), and voiding the transaction (box 156). With regard to the previous order, the ticket may be modified (box 158), or scrolled (box 160). Because these are the only options available from this screen, the system is configured to "listen" only for utterances conforming to these options. This is only a limited subset of the vocabulary stored in the employee's voice file, thus making the task of finding matches for captured utterances much easier, and thus more efficient. The scope of "listened for" utterances is narrowed further when, as described above, a menu item is entered followed by the word "without". In that instance, the system only "listens" for a smaller subset of the employee's vocabulary corresponding to ingredients associated with the most recently entered menu items. This selective "listening" feature, in which the system only "listens" for specific subsets of the employee's vocabulary, repeatedly adjusts the vocabulary subset to correspond to various circumstances throughout each transaction. This feature is also referred to herein as dynamic voice layering. With regard to the example described above, when the employee says menu items configured to have "without" items, a list of "without" items appears at the bottom of the options list. When the employee says "without", the register queries the employee's voice file to capture the subset of vocabulary words applicable to the particular context. The register then changes to a new state or voice layer in which it "listens" only for these words. This process takes place in each context in which the register is "listening" for a particular subset of vocabulary words.

In addition to showing the status of an order currently being taken, screen 140 shows the previous order taken on that register (box 162). This feature is convenient for fast food restaurants in which more than one order is often in preparation at the same time. The employee also has the option of modifying the previous order as discussed below.

As described above, there are a number of vocal commands associated with screen 140 by which the employee may perform a variety of functions (boxes 146–156). When the employee says the word "total", for example, the system advances to screen 180 as shown in FIG. 6. Screen 180 has many of the same features as screen 140 except that the Options menu is altered to include a different set of options. New menu items may still be entered (box 182) in response to the selection of which the system returns to screen 140. When the order is complete and it becomes time for payment to be tendered, several payment options are available as shown in boxes 184 and 186. If the employee says "cash" the system enters a cash payment mode. If exact change is tendered, the employee says "exact" and box 184 is removed from screen 180. In embodiments designed to be used in fast-food environments, the settlement options may be different than those designed for use in fine dining. For example, currently in fast-food restaurants only cash is accepted, whereas both cash and credit are generally accepted at fine dining establishments. It should be noted, however, that debit and credit cards will likely be accepted at fast-food restaurants in the very near future. Different embodiments are designed with these considerations in mind to support any desired type of settlement option.

When the payment option "cash" is selected and the amount tendered is entered via the keyboard, the system opens the cash drawer and advances to screen 220 as shown in FIG. 7. Also at this point, the order ticket is printed and the kitchen orders are sent. If an error is made in screen 220, the employee may say "oops" (box 222) to get back to screen 180 and correct the error. After the cash is received, the employee enters the amount tendered in response to which the cash drawer opens, the system updates the cash drawer balance to reflect the transaction, and the register indicates the amount of change to be given. At this point the system advances to screen 260 as shown in FIG. 8. Screen 260 shows a new options list (described below) for beginning a new order. When one of these options is chosen by the employee to initiate a new order, the current order ticket becomes blank, and the current order of screens 140, 180, and 220 becomes the previous order in box 262.

Several options are available to the employee from screen 260 before menu items are actually entered. The employee may specify whether an order is "to go", for "here", or a "drive-through" order (boxes 264, 266, or 268, respectively). By speaking any of these terms, appropriate information is transmitted to the food preparation employees so that the subsequent order may be appropriately packaged and presented. An employee may also access the employee time clock screen 110 of FIG. 4 by saying "time clock" (box 270). The employee may then clock-out by saying "clock-out", in response to which the employee is logged off the system. Finally, an employee with the appropriate level of system access may gain access to various administrative and inventory functions by saying "back office" (box 272).

Referring back to screen 220 in FIG. 7, the employee still has the option of modifying the previous ticket while in this screen. If the employee says "modify previous ticket" (box 226) the system enters a mode which allows the employee to add or subtract items from the previous ticket. Similarly, by saying "cancel" (box 228), the employee will be able to cancel either the current order or the previous ticket. In a specific embodiment, an employee may modify or cancel a previous transaction provided that the amount tendered has not been entered and the cash drawer opened. If an employee attempts to modify or cancel an already settled transaction, the system requires a manager's password before the modification or cancellation can be effected.

If the employee says "credit" while in screen 180 (FIG. 6), the system enters a payment mode in which the customer may tender a credit card. Similarly, if the employee says "debit" the system enters a payment mode in which the customer may tender a bank debit card.

Referring back to screen 140 (FIG. 5), the employee has the option of modifying the previous order ticket (box 158) as described above with reference to screen 4. Additionally, several other options are available. For example, by saying "modify ticket" (box 154), the employee may then add or subtract menu items from the current order. By saying the corrective utterance "oops" (box 152), the employee will then be able to reenter the most recently entered menu item. According to one embodiment, an error count is kept corresponding to specific product orders. When the error count for a particular product order reaches a predetermined level, the employee is prompted to repeat an utterance corresponding to the product order at least once. The utterance is captured and averaged with the previously stored pattern corresponding to the product order. In this way, the system performance can improve over time.

In a more specific embodiment, the corrective function described above with respect to box 152 is enhanced. In this embodiment, the options menu includes an additional option "incorrect". The utterances "oops" and "incorrect" are used for different types of corrections, and the system "listens" with different subsets of the user's vocabulary for each, i.e., the system operates within different voice layers depending upon which corrective option is chosen. When the system captures the utterance "oops", it operates as described above, backing up to the previous transaction stage for re-entry of the menu item. The utterance "incorrect" is used where the system misrecognizes an utterance. When the system captures "incorrect", it displays a box of other likely choices corresponding to the misrecognized utterance, the number of which may be programmed by the manager.

When the employee utters the number of the desired option, the system replaces the incorrect menu item on the ticket with the correct one. The system then marks the two menu items in the voice layer corresponding to the utterance "incorrect". This information is then used by the system in two ways. First, when an employee chooses the "train words" option (box 120 of FIG. 4) when logging on to the system, the system will looks to the "incorrect" voice layer to determine whether the employee should retrain for any of these words. If, for example, one of the words in this voice layer has been misrecognized five times, the system will prompt the employee to retrain this word.

Secondly, the manager may use the information for evaluation of system performance. The manager may look at the "incorrect" voice layer for each user and determine whether there are any particular words for which recognition problems are common. This might occur, for example, where two menu items sound alike. If such a system wide recognition problem is found, the system prompts the manager to rename one or both of the menu items. Subsequently, each time an employee clock in, the system will prompt her to train it for the new menu item. Additionally, the system will remove the replaced menu item from each user's vocabulary.

By saying "void" (box 156), the employee is able to void the current transaction. Finally, by saying "coupon" (box 150), the employee may reduce the amount due by an amount corresponding to the value of coupons tendered by the customer. In a specific embodiment, in response to the utterance "coupon", the system displays a numbered list of all coupons which are appropriate to the current order. The employee may select a coupon by saying the corresponding number, thereby reducing the amount due by the appropriate amount. The employee may also say "show details" followed by a number at which point the system will display any conditions or details with respect to the selected coupon.

When a restaurant wishes to train the system to recognize the voice of a new employee, a manager may log in to a special training mode for generation of a user vocabulary voice file for the new employee. The system prompts the new employee to repeat each word for her vocabulary three times, in response to which the system captures and stores the repetitions. The words for which the new employee is prompted depend on the level of system access anticipated for the new employee. This is determined by the manager when logging in to the special training mode. By the manager's specification of a security level, the system trains the employee with vocabulary words appropriate to that security level. For example, a new employee hired for the purpose of washing dishes would need access to the timeclock screen of FIG. 4 but would not need access to the order taking screen of FIG. 11. Therefore, the system would train such an employee only for the vocabulary words required for operating within screen 4 and any other modes appropriate for the particular employee. When all of the words appropriate to the new employee's access level have been captured and stored, the voice file for the new employee is complete. As described above, the voice file is stored on the system file server and is retrieved to an individual register in response to the performance of a log in procedure by the new employee as described above.

As an alternative to the "zero-based" voice file generation described in the preceding paragraph, a specific user's voice file may also be developed which corresponds to phonetic models of words which the system is intended to recognize. With the zero-based model described above, the system must capture at least one utterance from the user for every word the system is intended to recognize for that user, i.e., the system must be trained for every word for every user. In an embodiment of the invention employing phonetic based models, each of the words which the system is intended to recognize is modeled phonetically. When a user's voice file is being generated, rather than capturing every word for each user, only selected words which incorporate the necessary phonetic model components are captured. The user's vocabulary is then constructed, correlating the captured phonetic model components to the phonetic models of the words which the system is intended to recognize. One of the ramifications of such a system is that a new word may be added to the a user's vocabulary without requiring the user to actually train the system for the new word, as long as the phonetic model components for the new word corresponds to phonetic model components already captured for that user.

In addition to reducing the number of utterances required for the generation of a voice file, the corrective capability of the system is also enhanced in an embodiment employing phonetic based models. In such a system, when a correction is made for a specific word, the correction is prospectively applied to all words in the user's vocabulary which contain the same phonetic components. Thus, rather than just correcting for one vocabulary word at a time, recognition may be enhanced for a wide variety of words each time correction of a misunderstood utterance is undertaken.

The concept of dynamic voice layering as discussed herein refers to the fact that in any given context the system designed according to the invention "listens" for a specific subset of the user's vocabulary which is dependent upon the context. Given the fact that the status of employees and the menu change over time, this implies that a specific user's vocabulary and its various voice layers also must change over time. According to a specific embodiment of the invention, each time change in some aspect of the operational context of a business requires alteration of a user's vocabulary, the system prompts the user when she logs on to train the system to recognize the new words which reflect the change in the employee's status or the menu.

As discussed above, specific user vocabularies support different functions depending upon the sets of words, i.e., voice layers, included in the vocabularies. According to another specific embodiment of the invention, voice layers may be included in the user vocabularies which support receiving goods from vendors. Whenever the system creates a purchase order, a receiving sheet is also created which includes fields for entering the amount actually received of a particular type of goods. Once an employee has filled out the receiving sheet, she logs on to the system and says "receive goods" to the voice controlled register which enters the appropriate voice layer for that function and employee, and searches for all vendors with open purchase orders. The register then displays a list of the vendors for which there are open purchase orders. The employee selects the appropriate vendor and the system displays a list of the currently open purchase orders for that vendor. The employee then selects the appropriate purchase order, a copy of which is then displayed by the register with a highlight bar on the first item. The employee then enters the number for each item either orally or through the keyboard, in response to which the highlight bar moves to the next item.

Using a procedure similar to the one described above, tickets may be split in the fine dining environment. The waiter says "split ticket" and the system responds by querying the waiter into how many tickets the original ticket is to be split. When the waiter enters this information, the system displays the original ticket with a highlight bar on the first item. The waiter then designates to which ticket the item belongs by saying a number associated with the ticket. When the system has assigned the item to the designated ticket, the highlight bar moves to the next item on the original ticket. The procedure is repeated until all menu items have been assigned to one of the tickets.

A speaker dependent voice recognition system may not be practical for all applications. One example of such an application is a drive-through window at a fast food restaurant. The following is a description of one embodiment of the present invention which uses speaker independent voice recognition techniques for a drive-through window application.

With some modification, the voice controlled register of FIG. 1 may be used with this embodiment of the invention. However, unlike the speaker dependent embodiment described above, a unique voice file for each user is not maintained in this embodiment. This would obviously be impracticable as the number of potential users could conceivably number in the thousands. Instead, received sounds are compared to a speaker independent vocabulary in the system memory. Because of the tremendous variation in speech patterns and pronunciation, a specific embodiment of the invention employs several of these vocabularies, none of which are specific to any single user, in order to ensure an adequate level of accuracy with respect to word recognition. The invention also employs the concept of voice layering discussed above to minimize the number of words for which the system is "listening" in any given context. This is intended to further increase accuracy, because the larger the vocabulary, the greater the potential that one word will be mistaken for another.

According to a specific embodiment of the speaker independent system, four or six speaker independent voice files are employed. Each voice file contains vocabulary samples which are averages of a number of individual voice samples. One of the voice files is chosen for a particular transaction based upon an initial utterance by the customer. Initially, when a customer approaches the system to place an order, the active voice layer is a steering voice file which listens for a response from the customer to an initial question. Based on the characteristics of the response, the system chooses the voice file which most closely matches the characteristics of the customer's voice for the remainder of the transaction. As with the speaker dependent system, accuracy is further enhanced according to this embodiment because received sounds are only compared to selected subsets, i.e., voice layers, of the stored vocabulary in the voice file, the selected subset changing depending upon the context or stage of the transaction. So, for example, during the course of a transaction, the system may be configured to prompt the customer to verbally select a menu category such as "sandwiches", in response to which the system only "listens" for sandwich types rather than drinks, for example. Each menu category may be selected in this manner. Additionally, the system may be configured to sense the presence of a vehicle before enabling its microphone to "listen" for voice input. Alternatively, a light beam sensor, or a magnetic material sensor may be employed to sense the vehicle's presence. In this way, accidental recognition resulting in false orders being taken may be avoided. As with the speaker dependent system described above, this embodiment may employ audio feedback for order verification. That is, when a menu item is entered by the customer, the system repeats the order back for verification by the customer.

Another embodiment of the present invention is employed as part of a system by which orders for products may be placed over the telephone. The embodiment makes use of technology which provides the phone number of a caller to the party receiving the call before the call is answered. This information is used in the following manner. When the system receives an incoming call, it acquires the phone number of origin to determine whether the system has received a call from this number in the past. If the system has received a call from the number, it retrieves past ordering information and voice files associated with that number in preparation for taking an order for products using a cross between speaker dependent and speaker independent voice recognition. If, however, no calls have been received from the number, the system enters a vocabulary acquisition mode in which the caller is asked to repeat a couple of sentences. The system then compares the caller's voice samples to a set of voice models, and chooses the closest match. As with various embodiments described above, the system repeats each understood entry for verification by the caller. Each time an error is noted, the system modifies the caller's voice file to become increasingly more accurate. In this way, a quasi-speaker dependent system may be implemented with a theoretically unlimited number of users.

The present invention also includes a voice security feature which may be employed with various of the above-described embodiments of the invention. Each time a voice controlled register system acquires an utterance, it compares the utterance to a particular portion of a voice file/database looking for matches. The system then comes back with two things; a suspected match for the utterance, and value between 1 and 100 which reflects a level of confidence that the suspected match is correct. Each time the system returns a suspected match, the confidence level is compared to a threshold value. If the confidence level is below the threshold, the match is rejected. If the confidence level is above the threshold, the match is acceptable to the system. The security feature of the present invention goes beyond this threshold comparison to prevent unauthorized users from gaining access to the register system. First, the system compares the confidence level to previously calculated confidence levels for the match. If the confidence level is different from previous confidence levels in a statistically significant way, the system may ask the user to do a variety of things including, but not limited to, logging in again or re-entering a user-specific password before any further transactions may occur. In a more specific embodiment, confidence levels within a statistically acceptable range are used to update the acceptable range for the particular match, thus varying the range continuously with the employee's voice. These features will be particularly useful in the fast food environment where the system generally will not be configured to request a password for every transaction.

The present invention may also be employed to make emergency phone calls to emergency or law enforcement personnel. In the event of an emergency, a specially authorized user of the system, such as the manager, utters some emergency phrase, in response to which the system locates a match among various emergency options and transmits the appropriate emergency signal. For example, the manager might shout "call 911" and "fire" in response to which, the system would dial 911 and report a fire at the restaurant location.

Figure 9:
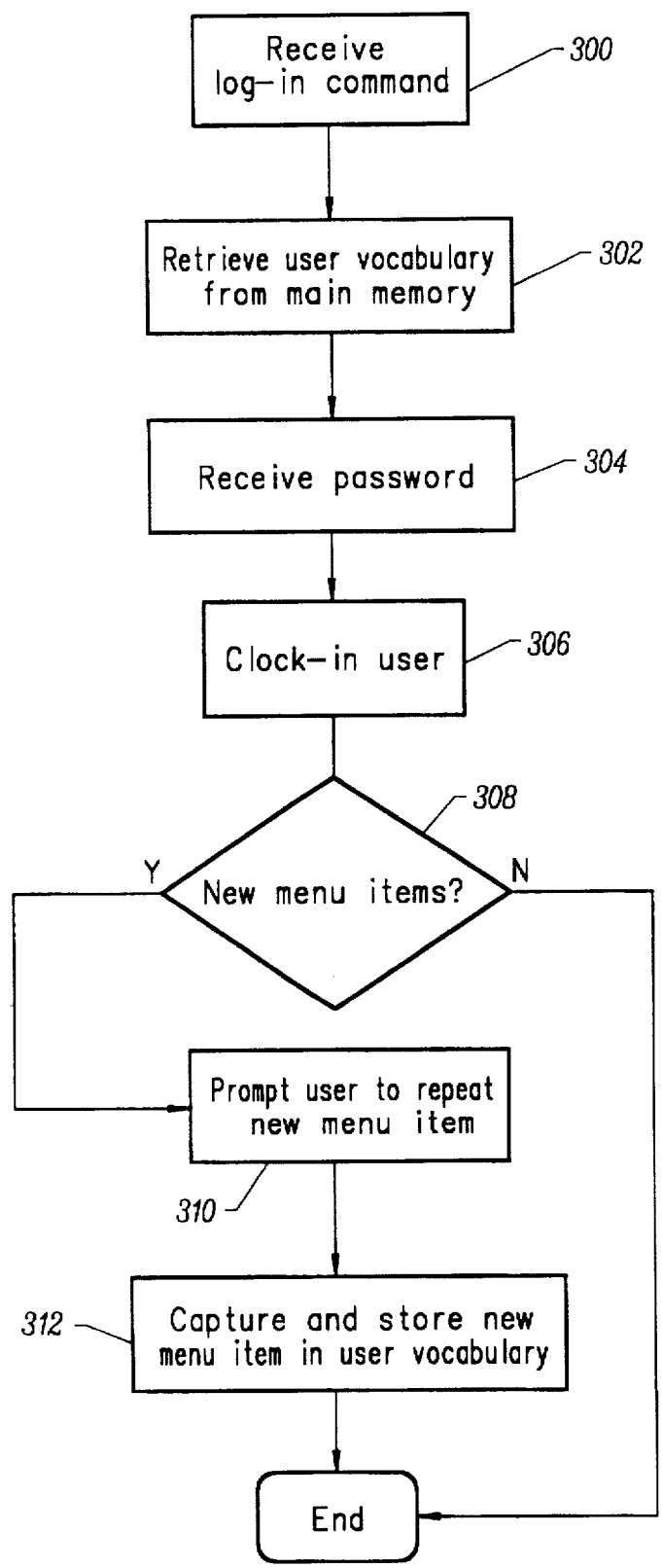
FIGS. 9 and 10 are flowcharts depicting various aspects of system operation according to a specific embodiment of the invention.
Figure 10:
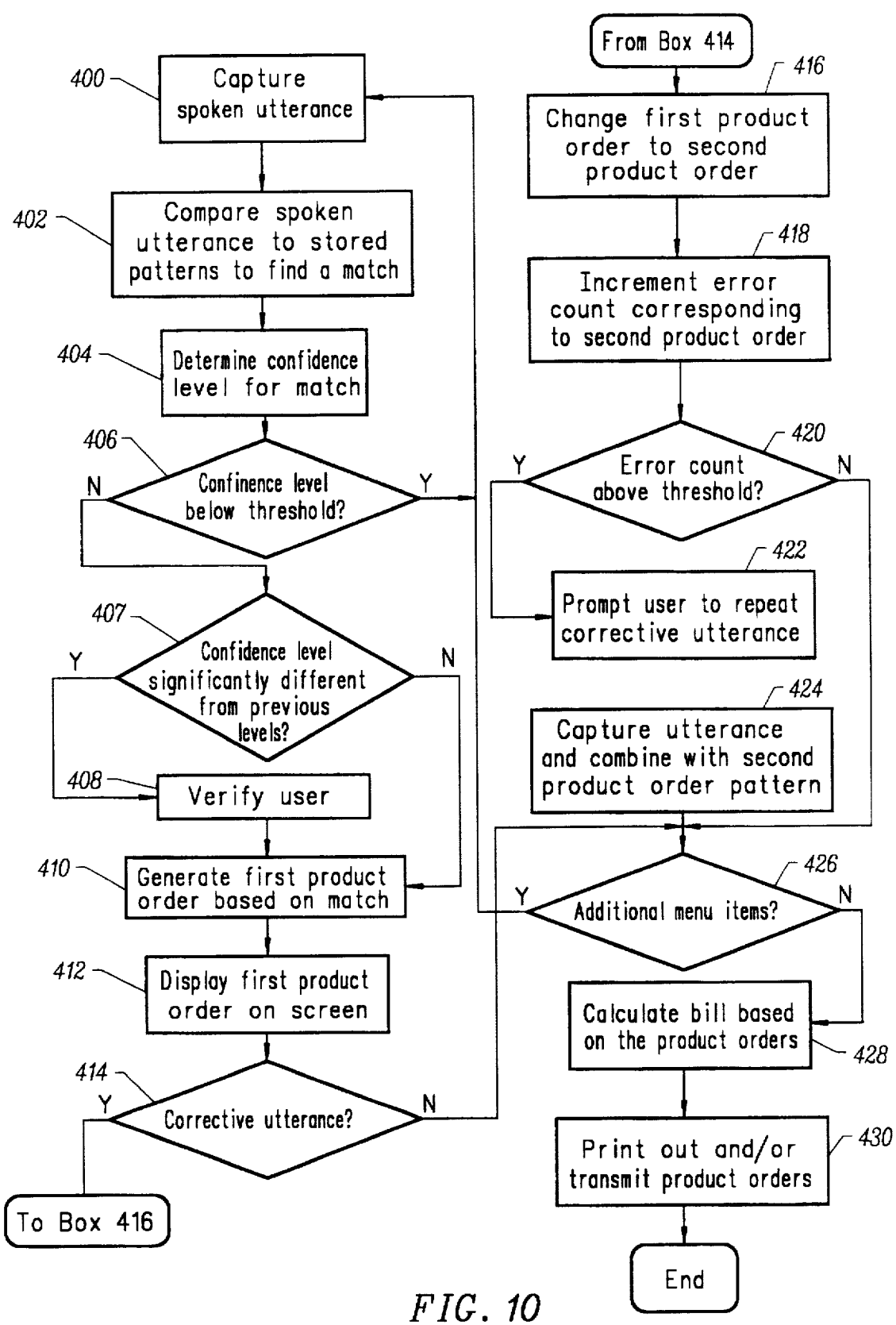

The flowcharts of FIGS. 9 and 10 depict the operation of a specific embodiment of the present invention. In FIG. 9, an employee logs onto the system and clocks-in. Initially, the system receives a vocal log-in command from an employee via the microphone (step 300). Alternatively, the log-in command may be entered via the keyboard. In response, the system retrieves the employee's vocabulary from a main memory (e.g., a hard disk or file server memory) (step 302). The main memory stores vocabularies (i.e., voice files) specific to each employee. The system then clocks-in the employee in response to a password or command (steps 304 and 306). Again, the password may be entered using a vocal command, or through the use of the keyboard. If additions are required to the employee's vocabulary (e.g., new menu items) (step 308), the system prompts the user to say the new menu item (step 310) which it captures with the microphone and adds to the employee's vocabulary (step 312).

FIG. 10 depicts the generation of a product order according to a specific embodiment of the invention. The system captures a spoken utterance from an employee corresponding to an intended menu item (step 400) and compares it to a plurality of stored patterns to find a match (402). When a match is found, a confidence level associated with the match is determined (step 404). If the confidence level is below a threshold, the system ignores the utterance (step 406). If the confidence level is sufficiently different from previously determined confidence levels associated with the match (step 407), the system verifies the user by, for example, prompting the employee to re-enter a password (step 408). Once the password is verified, the transaction may continue. A product order based on the match is then generated (step 410) and displayed on the screen (step 412). If an unintended menu item is entered in response to a first menu item being called out, it may be changed to another menu item in response to a corrective utterance (e.g., "incorrect" or "oops") from the employee (steps 414 and 416). An error count corresponding to the intended menu item is then incremented (418). When the error count reaches a predetermined level (step 420), the system prompts the employee to repeat an utterance corresponding to the intended menu item (step 422) which it captures and averages with the previously stored pattern corresponding to the intended menu item (step 424). This procedure is repeated for each menu item entered by the employee (step 426). The system then calculates a bill based on the total number of menu items entered (step 428) and either prints the menu items out, transmits audio representations of the menu items over a speaker, or both (step 430). As described above, for each comparing step, the system may compare the captured utterances to different subsets of the employee's vocabulary depending upon the circumstances and the options available to the employee. The subsets are determined according to which utterances are more likely to be spoken by the employee in a given situation.

Figure 11A:
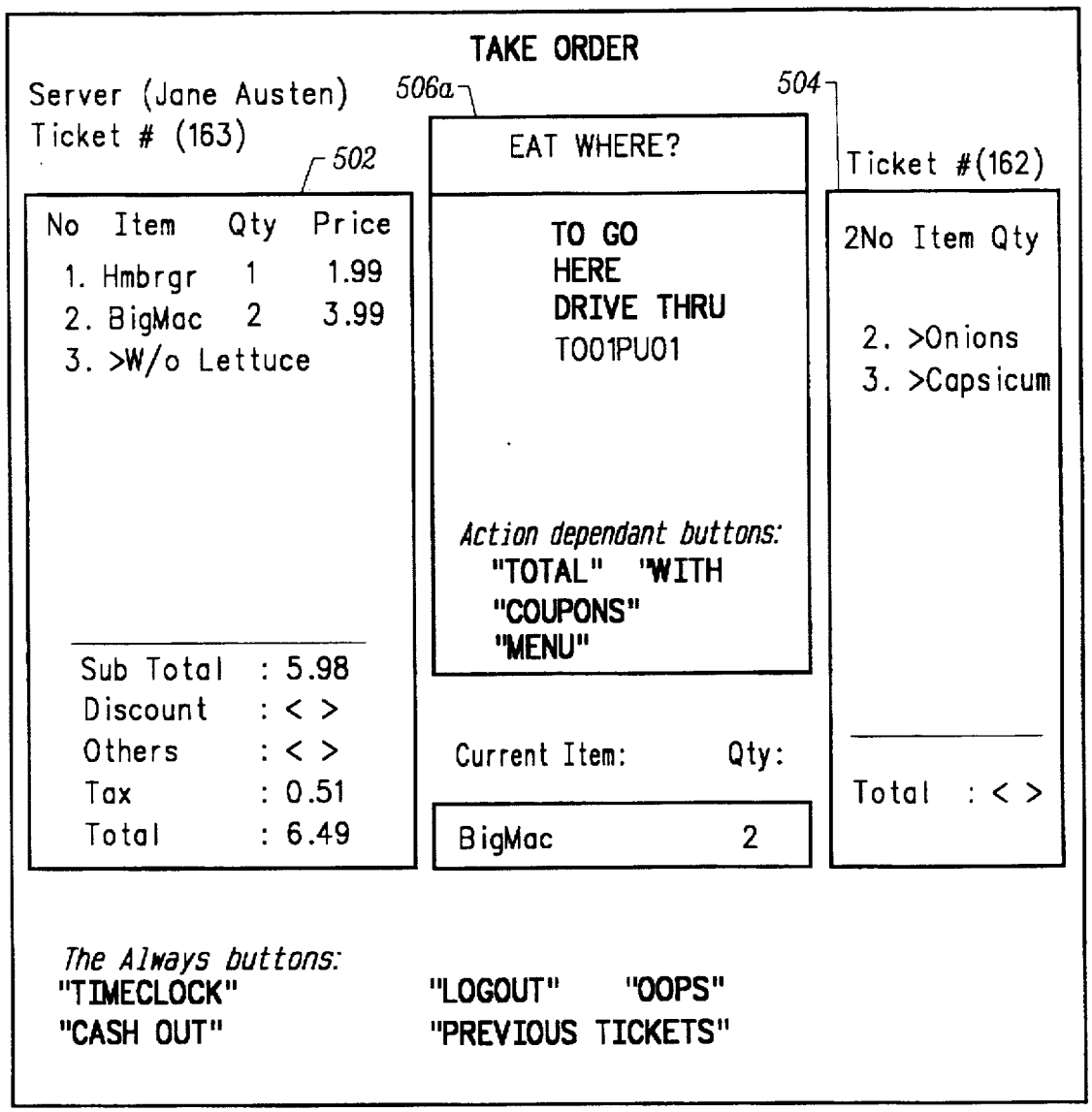
FIGS. 11a–n show a series of screens encountered by users of another embodiment of the present invention.
Figure 11E:
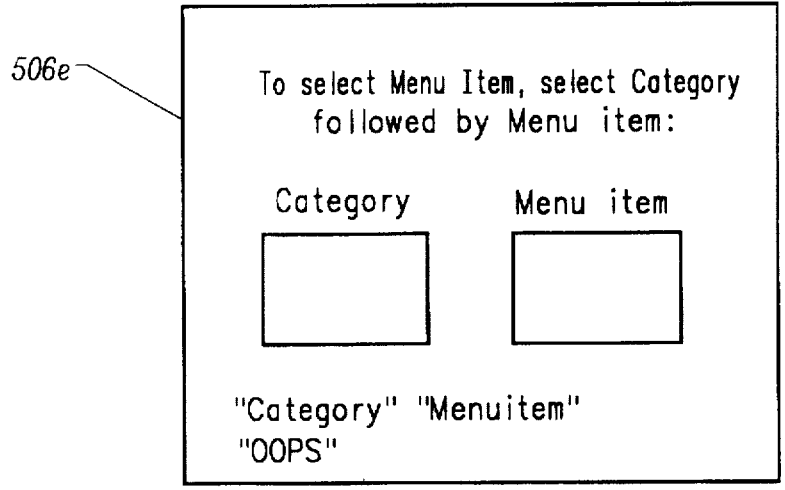

Another embodiment of the invention which is operationally similar to the embodiment described with respect to FIGS. 3–8 is shown in FIGS. 11a–n. Screen 500 in FIG. 11a includes a current order field 502, a previous order field 504, and an option field 506a. The fields on the bottom of screen 500 are either self-explanatory or may be understood with reference to descriptions of analogous functions above. FIGS. 11b–n show different option fields 506b–n depicting various transaction stages and operational modes. FIG. 11b shows option field 506b in which the amount tendered by a customer is entered and in which change is calculated. Option field 506b is reached when the employee says "total" while in option field 506a. FIG. 11c shows option field 506c which instructs the employee as to taking the order of a customer. This screen is reached by specifying "to go", "here", or "drive-through" in option field 506a. Option field 506d is encountered by the employee when the employee specifies a currently unavailable menu item while in option field 506c. Option field 506e is brought up when the employee says "menu" while viewing option field 506d.

Figure 11F:
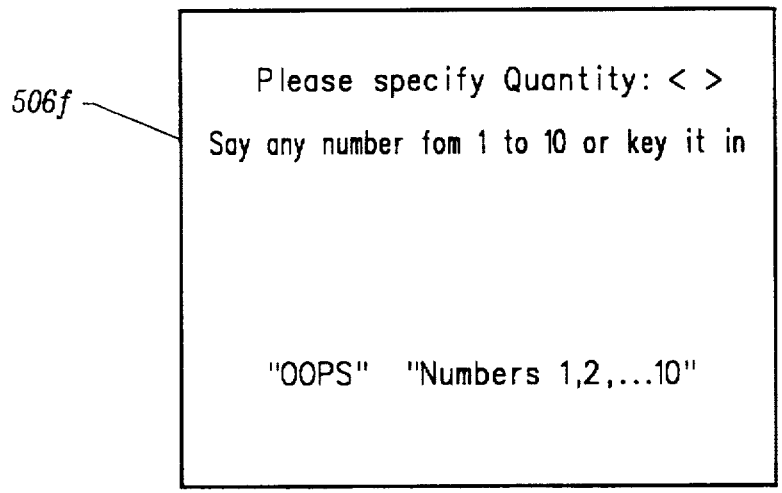
Figure 11G:
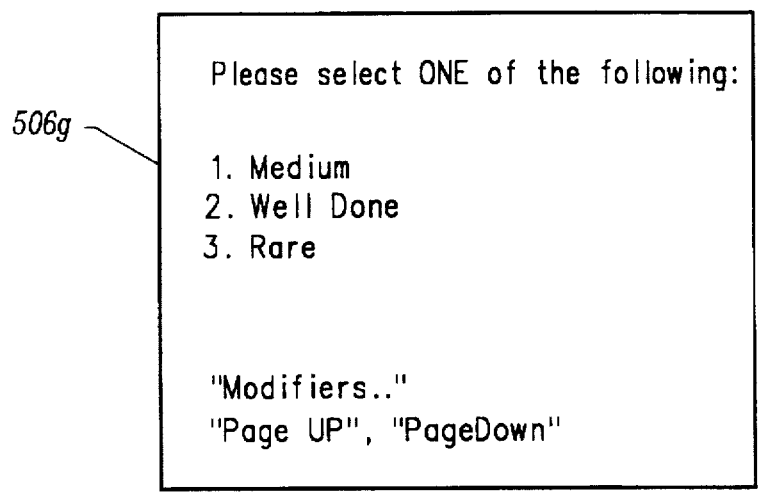
Figure 11H:
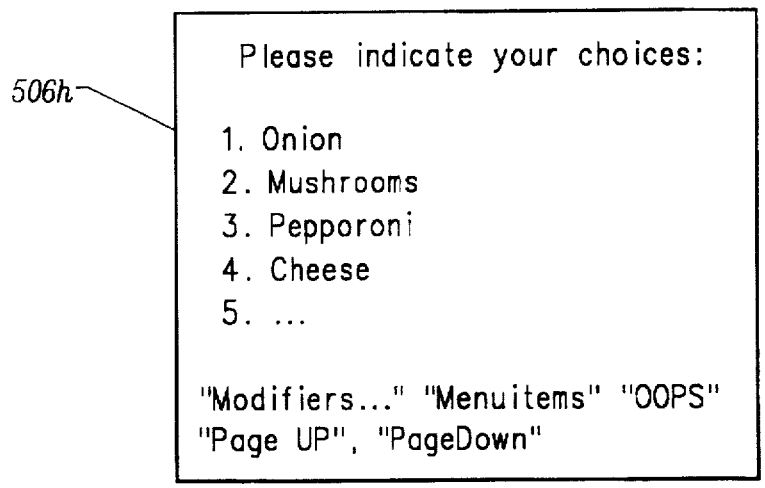
Figure 11I:
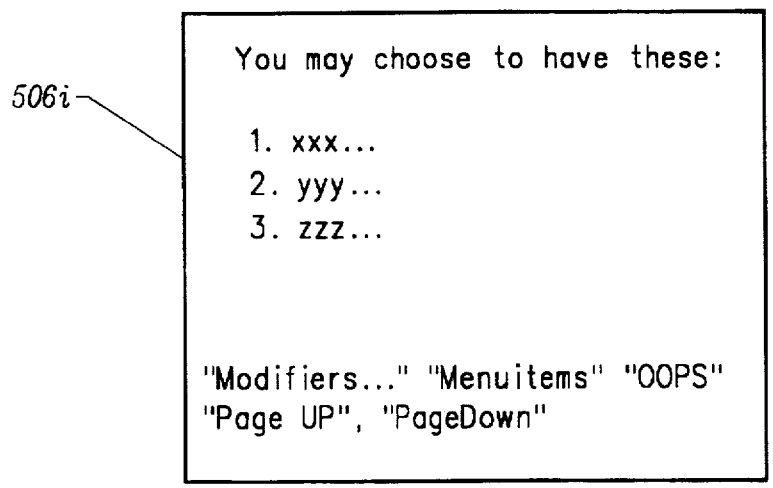
Figure 11J:
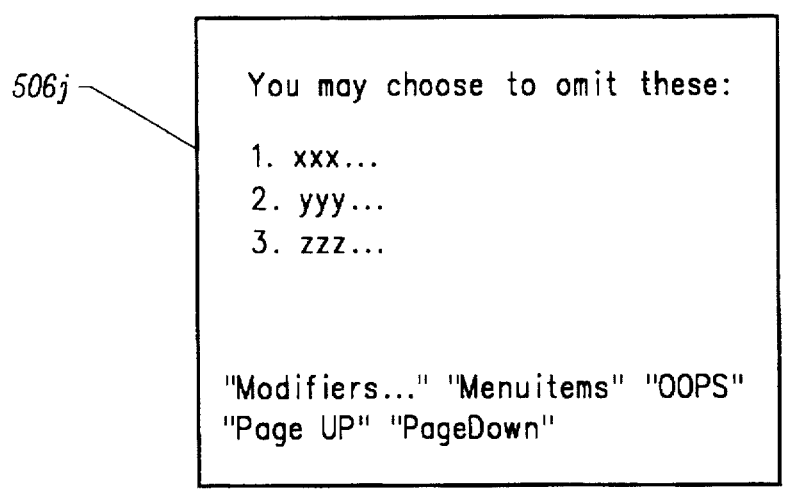

Option field 506f of FIG. 11f is encountered when a menu item has been entered into option field 506c. Option field 506g (or a similar option field) is encountered after a quantity has been entered into option field 506f and mandatory or "enforced" modifiers are required for the menu item. Option field 506h (or a similar option field) comes up when the menu item ordered has optional or "non-enforced" modifiers. Option fields 506i and 506j may be reached from option field 506c if such "with" or "without" options exist for the menu item designated.

Option field 506k of FIG. 11k may be reached from either option field 506a or 506c by the employee saying "coupon". Option field 506l is reached from option field 506k by the employee designating one of the coupon options. Options fields 506m and 506n are reached by designating the "manager" option in field 506k.

Figure 12:
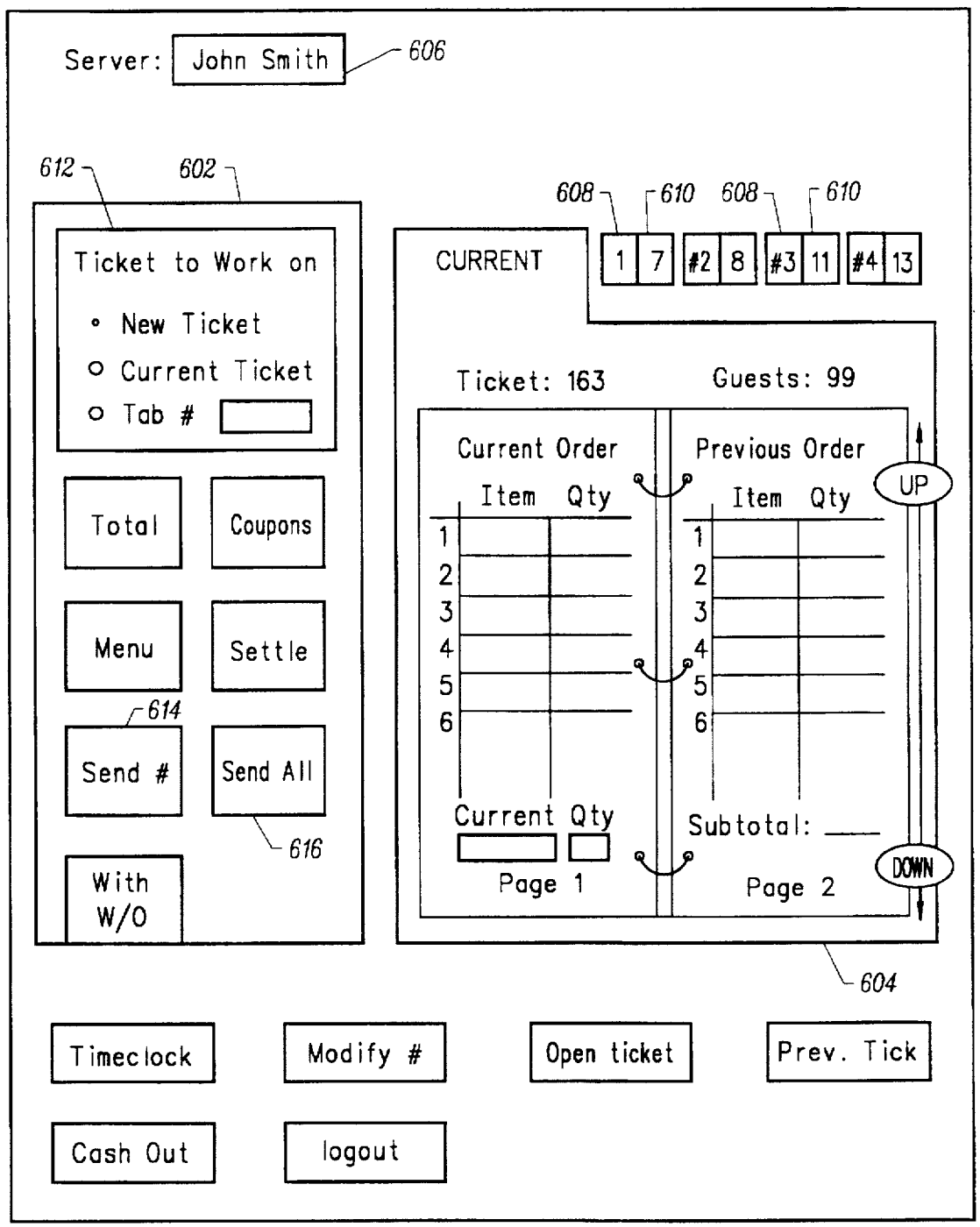
FIG. 12 shows a representative screen for an embodiment of the invention used in fine dining applications.

FIG. 12 shows a representative screen 600 for an embodiment of the invention used in fine dining applications. Option field 602 occupies the left side of screen 600. The right side of screen 602 shows an interface field 604 resembling a notebook which shows the currently active tickets corresponding to the server designated in server field 606. The left side of notebook interface 604 shows the current ticket as it is being ordered and before it has been sent to the kitchen. The right side of interface 604 shows tickets which have already been sent to the kitchen. Fields 608 and 610 show the currently active tickets and the corresponding table numbers, respectively. The active ticket fields are in order from left to right, the oldest being the left-most ticket. Ticket field 612 within option field 602 allows the waiter to display different tickets in interface field 604. For example, by saying "tab" and any of the active ticket numbers, the designated ticket number will appear on the right side of field 604. By saying "new ticket", the left side of field 604 is activated and the system voice layer "listens" for menu items to generate a new ticket. The "send" fields within option box 602 (fields 614 and 616) allow the waiter to send all or just one of the active tickets to the kitchen. Of the remaining fields within option field 602 and along the bottom of screen 600, the functions represented are analogous to those described above with respect to other embodiments. The voice layering concept described above is also employed in this embodiment to increase the accuracy and efficiency with which the system recognizes the waiter's utterances.

Figure 13:
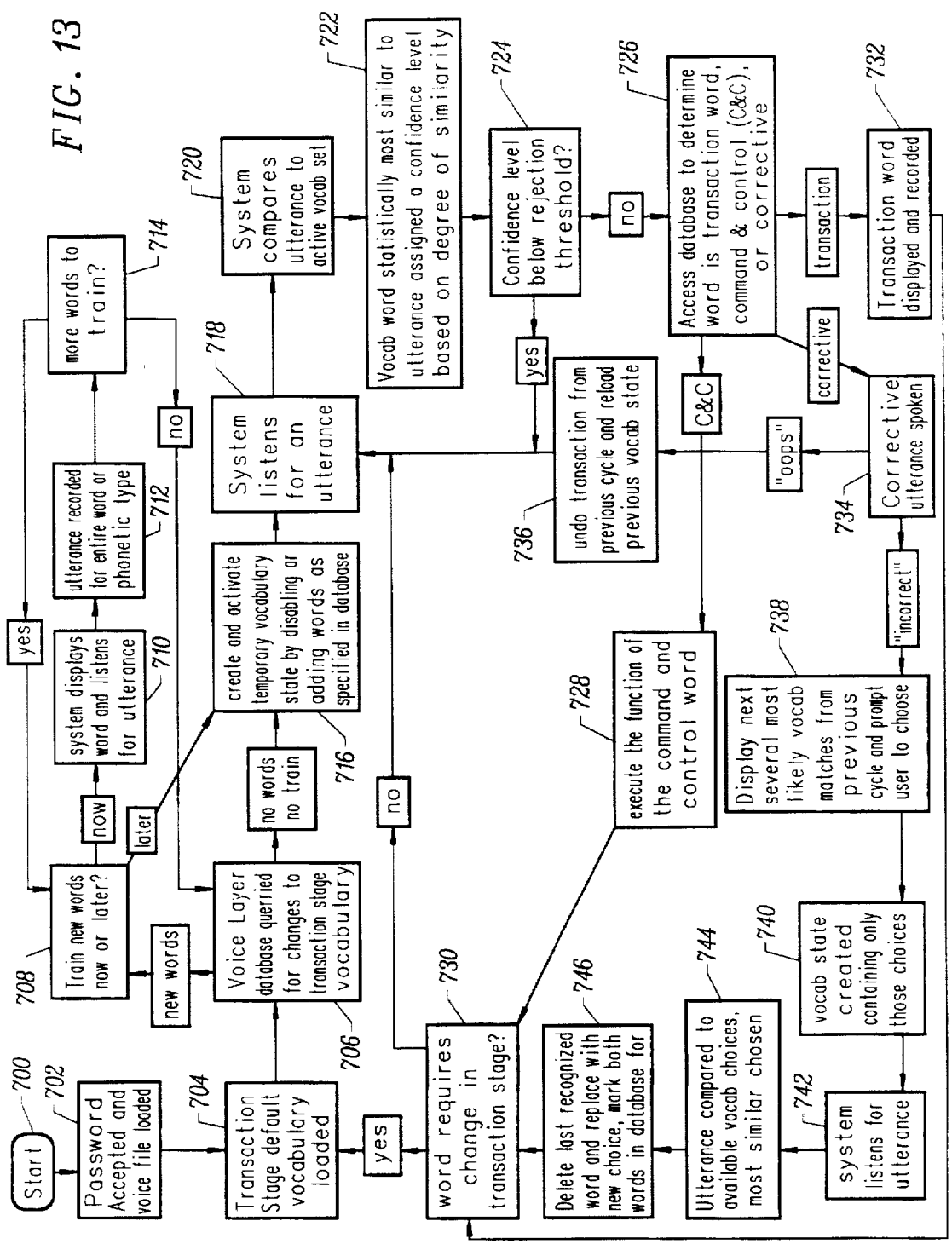
FIG. 13 is another flowchart depicting the operation of a specific embodiment of the invention.

Another flowchart representing a specific embodiment of the invention is shown in FIG. 13. The concept of dynamic voice layering described earlier may be easily understood with reference to this embodiment. After the user's password has been accepted and her voice file loaded (step 702), the default vocabulary, or voice layer, for the transaction stage is loaded (step 704). The system then queries whether changes to the transaction stage vocabulary are required (step 706). If training for new words is required, this is accomplished according to steps 708–714. If no new words are required, the system creates and activates a temporary vocabulary state or second voice layer (step 716) in which the system listens for utterances from the user (step 718). When an utterance is acquired, the system compares it to the current voice layer vocabulary, finds a likely match, and determines a confidence level for the match (steps 720 and 722). The confidence level is then compared to a threshold value (step 724). If the confidence level is below the threshold, the system continues to listen for an utterance. If the confidence level is above the threshold, the system determines what type of utterance has been captured (step 726) so that the appropriate voice layer may be loaded for the recognition of further utterances. If a command and control utterance has been captured, e.g., "logout", the system executes the desired function, changing the transaction stage if so required (steps 728 and 730).

If a transaction word is recognized, the word is recorded and displayed and the transaction is continued depending upon whether the transaction stage must be changed (steps 732 and 730). If a corrective utterance is recognized, two courses of action take place depending upon which corrective utterance is captured (step 734). If "oops" is captured, the system undoes the previous transaction, reloads the previous voice layer, and listens for new utterances (steps 736 and 718). If "incorrect" is captured, the system takes corrective action as described in steps 738–746.

While the invention has been particularly shown and described with reference to a specific embodiment thereof, it will be understood by those skilled in the art that the foregoing and other changes in the form and details may be made therein without departing from the spirit or scope of the invention.

What is claimed is:

1. A method for conducting a point-of-sale transaction using voice recognition, the transaction having a plurality of stages, the method comprising the steps of:

capturing a spoken utterance from a user with a sound input device;

comparing the spoken utterance to a plurality of stored patterns to find a match;

generating a first product order based on the match;

repeating the capturing, comparing, and generating steps for each additional spoken utterance; and calculating a bill based on the product orders;

wherein the plurality of stored patterns comprises a subset of a vocabulary stored in a memory, the subset changing for selected comparing steps to include different predetermined sets of likely words from the vocabulary, each predetermined set of the likely words corresponding to one of the transaction stages, the vocabulary corresponding to the user;

changing the first product order to a second product in response to a first corrective utterance from the user;

incrementing an error count corresponding to a first stored pattern, the first stored pattern corresponding to the second product order;

prompting the user to repeat a second corrective utterance corresponding to the second product order for at least one repetition when the error count reaches a predetermined number;

capturing the at least one repetition of the second corrective utterance with the sound input device; and combining the at least one repetition of the second corrective utterance with the first stored pattern to form a new pattern.

2. The method of claim 1 further comprising the steps of:

receiving a log-in command from the user; and retrieving the vocabulary from a main memory in response to the vocal log-in command, the main memory having a plurality of user vocabularies stored therein, each vocabulary corresponding to a different user.

3. The method of claim 2 further comprising the step of determining access by the user to different levels of different operating modes based upon a security level associated with the user.

4. The method of claim 3 wherein the different operating modes are selected from a group consisting of order taking, inventory, timekeeping, goods receiving, and troubleshooting.

5. The method of claim 1 further comprising the steps of:

receiving a password from the user; and clocking in the user in response to the password.

6. The method of claim 1 further comprising the steps of:

receiving a vocal clock-out command from the user via the sound input device; and clocking out the user in response to the vocal clock-out command.

7. The method of claim 1 further comprising the steps of:

prompting the user to speak at least one additional utterance;

capturing the at least one additional utterance with the sound input device; and adding the at least one additional utterance to the plurality of stored patterns in the vocabulary.

8. The method of claim 1 further comprising the step of displaying the first product order on a display means.

9. The method of claim 1 further comprising the step of printing a printout corresponding to the product orders.

10. The method of claim 1 further comprising the step of opening a cash drawer in response to an open command from the user.

11. The method of claim 1 further comprising the steps of:

capturing a corrective utterance from the user with the sound input device;

deleting the first product order in response to the corrective utterance;

capturing a second utterance from the user with the sound input device;

comparing the second utterance to the plurality of stored patterns to find a second match; and generating a second product order to replace the first product order based on the second match.

12. The method of claim 1 wherein each match found with the comparing step has a confidence level associated therewith, the method further comprising the step of prompting the user to enter a password when the confidence level associated with a particular match differs from previous confidence levels associated with the particular match by more than a first amount.

13. The method of claim 1 further comprising the steps of:

receiving a log in command from a first user;

retrieving a first user vocabulary corresponding to the first user from a main memory in response to the log in command, the main memory having a plurality of user vocabularies stored therein, each user vocabulary corresponding to a different user;

storing a location marker for the users active voice file;

capturing a log out command;

sending the current copy of the voice file back to the main memory;

updating the marker for the location of the active vocabulary for the user;

prompting a new user to repeat a plurality of test utterances in succession;

capturing the plurality of test utterances from the new user for storage in the main memory as part of the new user vocabulary, each test utterance being repeated by the new user at least once; and storing the plurality of test utterances in the main memory, the test utterances corresponding to the new user vocabulary.

14. The method of claim 1 wherein there are a plurality of vocabularies stored in the memory representing different voice models, the method further comprising the step of selecting the first vocabulary from the plurality of vocabularies based on an analysis of at least a first utterance by the user.

15. The method of claim 13 further comprising directing the system to create a new user;

assigning at least one level of access rights to the new user; and adding vocabulary words associated with each level of access to a vocabulary for the new user.

* * * * *